United States Patent Office 3,644,461
Patented Feb. 22, 1972

3,644,461
PREPARATION OF ALKYL ISOCYANATES
Kenneth C. Rennells, Whitehall, Mich., assignor to
The Ott Chemical Company
No Drawing. Filed Feb. 19, 1969, Ser. No. 800,778
Int. Cl. C07c 119/04
U.S. Cl. 260—453 P  6 Claims

ABSTRACT OF THE DISCLOSURE

A method of dehydrochlorinating an alkyl carbamyl chloride to provide the corresponding alkyl isocyanate derivative by heating said alkali carbamyl chlorine in the presence of a tetraalkylurea which acts as an acid acceptor, thereby promoting said dehydrochlorination. The alkyl isocyanate is then separated from the tetraalkylurea which is now in the hydrochloric acid salt form. Use of tetraalkylurea as an acid acceptor, compared to prior art basic amines results in lesser contamination of the alkyl isocyanate due to a substantial reduction in formation of color bodies.

---

In one of the conventional methods of producing alkyl isocyanates an alkyl carbamyl chloride is dehydrochlorinated. The dehydrochlorination is usually effected by heating the alkyl carbamyl chloride in presence of a basic tertiary amine which is capable of acting as an acid acceptor, thereby promoting the dehydrochlorination reaction. The alkyl isocyanate is then separated from the amine which is now in the form of the hydrochloric acid salt.

One of the drawbacks in the above process is that heretofore many of the basic amines utilized in the reaction tend to contaminate the desired alkyl isocyanate product. Specifically, the amines during the reaction have a tendency to become oxidized to a greater or lesser degree and form color bodies. These color bodies are carried through the reaction scheme and thereby contaminate the alkyl isocyanate product. To obtain a purified isocyanate product, as is desired in many situations, further processing must take place. A typical prior art basic amine used in the just-described process is dimethylaniline. While this substance is an excellent acid acceptor and efficiently promotes the dehydrochlorination reaction, it is also oxidized during the reaction as just noted and imparts color bodies to the isocyanate product.

In view of the above, it therefore becomes an object of the invention to provide an improved method of dehydrochlorinating an alkyl carbamyl chloride to provide an alkyl isocyanate, whereby contamination of the isocyanate product is substantially reduced due to reduction in formation of color bodies.

Another object of the invention is to carry out the above aim by using a basic tertiary amine as an acid acceptor in the reaction which is exceptionally stable and shows little tendency to become oxidized and thereby provide color body contaminants.

Another object of the invention is to provide a method of making relatively pure alkyl isocyanates as outlined above using conventional equipment, without resort to additional process steps than those practiced via the prior art method of dehydrochlorinating utilizing a basic tertiary amine to effect the dehydrochlorination.

Other objects will appear hereinafter.

In accordance with the invention an improved method of making alkyl isocyanates has been discovered. As briefly described above, the prior art method comprises heating an alkyl carbamyl chloride in presence of a basic tertiary amine capable of acting as an acid acceptor, whereby said dehydrochlorination is effected. An alkyl isocyanate derivative of said alkyl carbamyl chloride is thus produced, and recovered by separation from said amine which is now in the hydrochloric acid salt form.

The improvement here which comprises the gist of the invention involves utilizing a tetraalkylurea as the acid acceptor. In such case then contamination of the alkyl isocyanate is substantially reduced. This is due to the fact that the tetraalkylurea is exceptionally stable and exhibits little tendency to be oxidized during the heating step. Thus, in turn, there is a substantial reduction in formation of color bodies due to said oxidation compared to other prior art basic amines normally used in this process, such as dimethylaniline.

The first step in the process of the invention is to heat an alkyl carbamyl chloride in presence of a tetraalkylurea. The alkyl carbamyl chloride is a primary alkyl carbamyl chloride, preferably one containing a lower alkyl radical containing from about 1 to about 4 carbon atoms. Methyl carbamyl chloride is typical here.

Preferred tetraalkylureas are those which possess alkyl radicals containing from about one to about three carbon atoms. These alkyl radicals may all be the same or differ in their carbon content. A preferred tetraalkylurea here is tetramethylurea, due to its excellent stability and its demonstration to exhibit little tendency to be oxidized during this reaction or thereafter.

The reaction itself is usually carried out at a temperature ranging from about 75° C. to about 120° C. A reaction temperature of 100° C. is typical here. The time of reaction may vary extensively, through it is normally completed in a time ranging from about 15 minutes to about 16 hours.

The dehydrochlorination reaction may be run with or without benefit of a solvent. Thus, such solvents as benzene, toluene, halogenated aliphatics such as ethylene dichloride, etc. may be employed. Of course, the reaction may be effected with equal facility in absence of a solvent.

When a solvent is employed one excellent source is the tetraalkylurea itself. Thus, an excess of tetraalkylurea is employed over the equimolar amounts normally used to perform its dehydrochlorination function. That is, normally, one mole of tetraalkylurea is employed per mole of alkyl carbamyl chloride. However, if an excess of tetraalkylurea over this amount is used the excess may then act as a solvating medium. In such case generally from about 1.5 moles of tetraalkylurea to about 2.5 moles of tetraalkylurea is utilized per mole of alkyl carbamyl chloride.

At the completion of the reaction the alkyl isocyanate is then separated by conventional techniques from the tetraalkylurea now in hydrochloric acid salt form. The alkyl isocyanate, of course, is also separated from the solvent utilized in the reaction, if such is the case.

The tetraalkylurea in salt form is then neutralized back to its basic form, and thus can be reused in the method of the invention.

The following example illustrates the process of the invention. It is understood, of course, that this example is merely meant to be illustrative, and that the invention is not to be limited thereto. All parts and percentages are by weight unless otherwise expressed.

EXAMPLE I

To methyl carbamyl chloride (1.74 moles) heated to 65° C. was added 0.96 mole of tetramethylurea. Distillation of the reaction mixture at atmospheric pressure gave 48.9 g. of methyl isocyanate, B.P. 37° C. This represented a 90% yield of product based upon tetramethylurea.

While the invention has been described in connection with specific embodiments thereof, it will be understood that it is capable of further modification, and this application is intended to cover any variations, uses, or adaptations of the invention following, in general, the principles of the invention and including such departures, from the present disclosure as come within known or customary practice in the art to which the invention pertains and as may be applied to the essential features hereinbefore set forth, and as fall within the scope of the inventioin.

The invention is hereby claimed as follows.

I claim:

1. A method for the preparation of alkyl isocyanates comprising the steps of heating an alkyl carbamoyl chloride wherein the alkyl group contains from 1 to 4 carbon atoms, in the presence of at least an equimolar quantity, with respect to the alkyl carbamoyl chloride, of a tetraalkyl urea wherein the alkyl groups have from 1 to 3 carbon atoms, at a temperature of about 75° C. to about 120° C. to form the corresponding alkyl isocyanate and a tetraalkyl hydrochloride and separating and recovering said alkyl isocyanate from said tetraalkyl urea hydrochloride.

2. The method of claim 1 wherein said tetraalkylurea is tetramethylurea.

3. The method of claim 1 wherein said alkyl carbamyl chloride is methyl carbamyl chloride whereby methyl isocyanate is produced.

4. The method of claim 2 wherein said tetramethylurea is present in an amount in excess of that necessary to perform its function as an acid acceptor, and thus also acts as a solvent is said method.

5. The method of claim 4 wherein tetramethylurea is present at the initiation of said reaction in an amount ranging from about 1.5 moles to about 2.5 moles per mole of alkyl carbamyl chloride.

6. The method of claim 5 wherein said tetramethylurea is present in an amount of about 2 moles per mole of alkyl carbamyl chloride present.

References Cited

UNITED STATES PATENTS 3,440,268   4/1969   Stamm _____ 260—453

CHARLES B. PARKER, Primary Examiner

D. H. TORRENCE, Assistant Examiner